US007496649B2

(12) United States Patent
Lee, IV et al.

(10) Patent No.: US 7,496,649 B2
(45) Date of Patent: Feb. 24, 2009

(54) POLICY APPLICATION ACROSS MULTIPLE NODES

(75) Inventors: Alfred Lee, IV, Seattle, WA (US); David Levin, Redmond, WA (US); Erik B. Christensen, Seattle, WA (US); Sara Wong, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1074 days.

(21) Appl. No.: 10/783,554

(22) Filed: Feb. 20, 2004

(65) Prior Publication Data

US 2005/0188072 A1 Aug. 25, 2005

(51) Int. Cl.
*G06F 15/173* (2006.01)

(52) U.S. Cl. ................................ 709/223; 726/1; 726/2

(58) Field of Classification Search ................. 709/219, 709/224, 227, 230, 229, 245, 246; 726/1, 726/12; 370/238, 466, 389; 380/279; 340/442; 705/32

See application file for complete search history.

(56) References Cited

U.S. PATENT DOCUMENTS 5,224,098 A 6/1993 Bird et al.
5,425,028 A * 6/1995 Britton et al. ............... 370/389
5,530,832 A 6/1996 So et al.
5,764,887 A 6/1998 Kells et al.
5,845,081 A * 12/1998 Rangarajan et al. ......... 709/224
5,894,557 A 4/1999 Bade et al.
5,941,947 A 8/1999 Brown et al.
5,987,517 A 11/1999 Firth et al.
6,243,759 B1 6/2001 Boden et al.
6,338,117 B1 1/2002 Challenger et al.
6,430,576 B1 8/2002 Gates et al.
6,519,636 B2 2/2003 Engel et al.
6,519,764 B1 2/2003 Atkinson et al.
6,545,599 B2 * 4/2003 Derbyshire et al. ......... 340/442
6,598,121 B2 7/2003 Challenger et al.
6,643,684 B1 11/2003 Malkin et al.
6,662,235 B1 12/2003 Challis et al.
6,694,368 B1 2/2004 An et al.
7,000,006 B1 2/2006 Chen
7,054,332 B2 * 5/2006 Favichia et al. ............. 370/466

(Continued)

OTHER PUBLICATIONS

Hypertext Transfer Protocol—HTTP/1.1; World Wide Web Consortium (W3C); http://www.w3.org/Protocols/rfc2626/rfc2616-sec12.html; Chapter 12, pp. 46-47. Jun. 1999.

(Continued)

*Primary Examiner*—Dustin Nguyen
(74) *Attorney, Agent, or Firm*—Lee & Hayes, PLLC

(57) ABSTRACT

A method includes retrieving an intermediate node policy characterizing communication properties supported by an intermediate node, the intermediate node being between a source node and a destination node in a communication path. The method includes forming a first policy-compliant message in accordance with the intermediate node policy, the first policy-compliant message including a request for a destination node policy characterizing communication properties supported by the destination node. A system includes a policy retriever comparing a source policy to one to an intermediate policy to determine whether the source policy is compatible with the intermediate policy. A message generator generates a policy request message by applying the intermediate policy to a request for a policy related to a destination node.

27 Claims, 7 Drawing Sheets

U.S. PATENT DOCUMENTS

| | | | | |
|---|---|---|---|---|
| 7,089,313 | B2 * | 8/2006 | Lee et al. | 709/227 |
| 7,181,537 | B2 * | 2/2007 | Costa-Requena et al. | 709/246 |
| 2003/0149781 | A1 * | 8/2003 | Yared et al. | 709/229 |
| 2004/0015421 | A1 * | 1/2004 | Erfurt et al. | 705/32 |
| 2004/0117494 | A1 * | 6/2004 | Mitchell et al. | 709/230 |
| 2004/0215824 | A1 * | 10/2004 | Payrits | 709/245 |
| 2005/0053007 | A1 * | 3/2005 | Bernhardt et al. | 370/238 |
| 2005/0080914 | A1 * | 4/2005 | Lerner et al. | 709/230 |
| 2005/0198206 | A1 * | 9/2005 | Miller et al. | 709/219 |
| 2007/0192827 | A1 * | 8/2007 | Maxted et al. | 726/1 |
| 2007/0234417 | A1 * | 10/2007 | Blakley, III et al. | 726/12 |
| 2008/0056500 | A1 * | 3/2008 | Bradley et al. | 380/279 |

OTHER PUBLICATIONS

Bauer, Lujo, et al.; "A General and Flexible Access-Control System for the Web"; Copyright 2002 by the USENIX Association; San Francisco, California; Aug. 5-9, 2002; 17 pages.
Verma, Dinesh C. et al.; "Policy-Based Management of Content Distribution Networks"; IEEE Network, The Magazine of Global Internetworking; Mar./Apr. 2002; vol. 16, No. 2, pp. 34-39.

* cited by examiner

```
<wsp:Policy xmlns:wsse="..." xmlns:wssx="...">
  <wsp:ExactlyOne>  202
    <wsp:All wsp:Usage="wsp:Required" wsp:Preference="100">  208
      <wsse:SecurityToken>
        <wsse:TokenType>wsse:Kerberosv5TGT</wsse:TokenType>
204   </wsse:SecurityToken>
      <wssx:Privacy />
    </wsp:All>  208
    <wsp:All wsp:Preference="1" wsp:Usage="wsp:Required">  210
      <wsse:SecurityToken>
        <wsse:TokenType>wsse:UsernameToken</wsse:TokenType>
      </wsse:SecurityToken>
      <wsse:Integrity>
206     <wsse:Algorithm Type="wsse:AlgEncryption"
          URI="http://www.w3.org/2001/04/xmlenc#3des-cbc" />
      </wsse:Integrity>
      <wssx:Audit />
    </wsp:All>  210
  </wsp:ExactlyOne>  202
</wsp:Policy>
```

Fig. 2

POLICY APPLICATION ACROSS MULTIPLE NODES

RELATED APPLICATIONS

This patent application is related to co-owned U.S. patent application Ser. No. 10/783,776, entitled "Invalid Policy Detection", now still pending, and U.S. patent application Ser. No. 10/783,751, entitled "Dynamic Protocol Construction,", now U.S. Pat. No. 7,243,157, both of which are hereby incorporated by reference for all that they disclose.

TECHNICAL FIELD

The described subject matter relates to electronic computing, and more particularly to systems and methods for applying policy across multiple nodes.

BACKGROUND

Communication between various computing devices (e.g., personal computers, server computers, mobile devices) is increasingly commonplace in a number of network environments, such as, e.g., the Internet and corporate intranets to name only a few examples. Often, these computing devices are configured for communication in accordance with preferred or even required protocols. Traditionally when a computing device attempts to engage in communication with another computing device using an unrecognized protocol, an error message is sent to the first device, and further communication typically cannot proceed.

As an illustration, a commercial web site may require a user's computer to comply with a particular protocol or data format before the user is granted access to the payment web pages. For example, the commercial website may require that incoming messages be encoded according to a particular encryption scheme for security purposes, or that incoming messages be formatted using a particular compression scheme to facilitate efficient transaction processing. If the user's computer is not equipped to abide by the specified protocol or data format, the user's computer generally receives an error notification, such as a "400" error code defined in the Hypertext Transport Protocol (HTTP). Typically, such error notifications are not very informative or helpful for a user to remedy the error, if possible, and continue communicating with the commercial website.

In addition, over time, as new protocols and data formatting techniques emerge, not all computing devices will necessarily have adopted the latest protocols and data formatting techniques. Thus, there will typically always be some differences between the protocols and/or data formats used by some computing devices and the protocols and/or data formats used by other computing devices. However, although some computing devices may not be able to apply the newest protocols or data formats, they typically can communicate using some other protocols or data formats. Unfortunately, a traditional computing device does not typically have the ability to identify the different protocols and/or data formats used by another computing device, and adapt, if possible, to the different protocols and/or data formats.

Such communication problems can be exacerbated when one or more computing devices are present in the path between two devices attempting to communicate. In such a case, all of the computing devices may have particular requirements that must be met by the other computing devices. Thus, any mismatch in data protocol or format between adjacent computing devices in the communication path can lead to a break-down in communication.

SUMMARY

Implementations are described and claimed herein to dynamically construct a protocol to facilitate communication between nodes and across multiple nodes. Implementations utilize policies associated with the nodes to specify protocol properties of the nodes. A policy expression in a policy related to a node can be selected by another node to construct a protocol between the two nodes. A policy expression selection process can be applied to multiple nodes in a communication path to construct a protocol across the multiple nodes.

In some implementations, articles of manufacture are provided as computer program products. One implementation of a computer program product provides a computer program storage medium readable by a computer system and encoding a computer program for dynamic protocol construction across multiple nodes. Another implementation of a computer program product may be provided in a computer data signal embodied in a carrier wave by a computing system and encoding the computer program for dynamic protocol construction across multiple nodes.

The computer program product encodes a computer program for executing on a computer system a computer process that retrieves an intermediate node policy characterizing communication properties supported by an intermediate node between a source node and a destination node in a communication path. The process further includes forming a policy-compliant message in accordance with the intermediate node policy, wherein the policy-compliant message includes a request for a destination node policy characterizing communication properties supported by the destination node.

In another implementation, a method includes retrieving an intermediate node policy and a destination node policy, the intermediate node policy characterizing communication properties supported by an intermediate node and the destination node policy characterizing communication properties supported by a destination node, the intermediate node being between a source node and the destination node in a communication path. The method further includes applying the intermediate node policy and the destination node policy to an underlying message in order of the destination node policy followed by the intermediate node policy.

In yet another implementation, a system includes a source node policy having protocol parameters related to a source node and a policy retriever retrieving an intermediate node policy having protocol parameters related to and intermediate node between the source node and a destination node in a communication path. The system also includes a message generator generating a request message in accordance with the intermediate node policy, the request message including a request for a destination node policy having protocol parameters related to the destination node.

BRIEF DESCRIPTION OF THE DRAWINGS

FIG. 2 illustrates an exemplary policy including assertions that may be used to construct a protocol for communication between two nodes;

DETAILED DESCRIPTION

Overview

Briefly, dynamic protocol construction may be implemented to facilitate communication among multiple nodes. Because data communication protocols and formats can change, communication among multiple nodes can be seriously hampered by mismatches in the protocols and formats employed by any of the nodes. The dynamic protocol construction scheme described herein allows a node to generate a policy having statements (referred to as assertions) that characterize properties of the node. The properties can relate to, for example, capabilities and/or requirements of the node. Another node that attempts to communicate with the first node can retrieve the policy and generate messages that conform to the assertions given therein and thereby successfully communicate with the node. When multiple nodes are present in a communication path, the policies of all the nodes are retrieved and applied in particular orders for successful communication across the entire communication path.

Exemplary System

Figure 1:
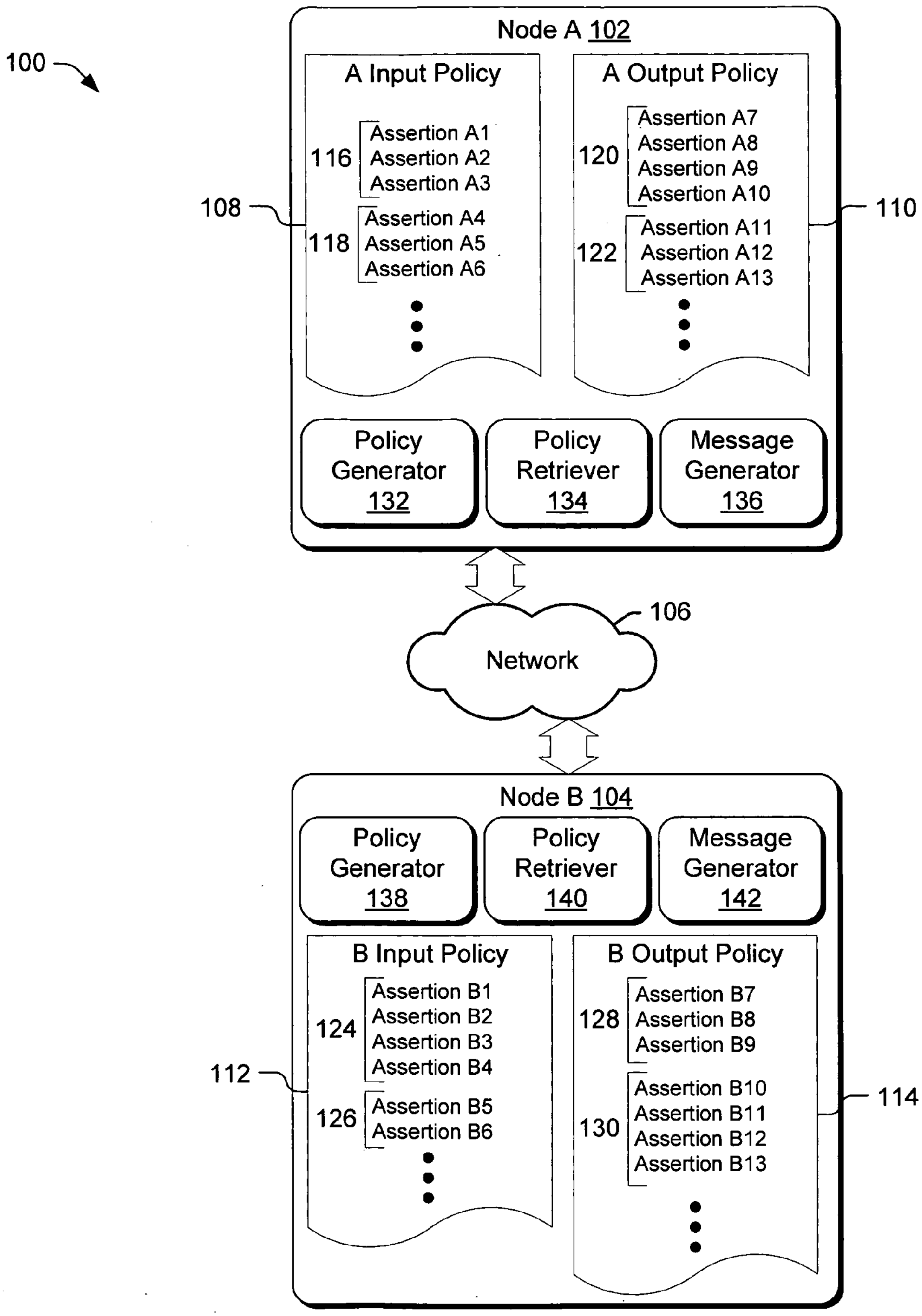
FIG. 1 illustrates an exemplary operating environment in which dynamic protocol construction can be carried out.

FIG. 1 illustrates an exemplary operating environment 100 in which dynamic protocol construction can be carried out. Two nodes, node A 102 and node B 104, communicate with each other via a network 106. Node A 102 and node B 104 may be arranged in any number of configurations. Typical configurations are a client/server configuration or a peer-to-peer configuration. The network 106 may include other intermediate nodes (not shown), through which data pass during communication between node A 102 and node B. As such, exemplary communication configurations include can 1 to N (i.e., single node to multiple node) and N to N (i.e., multiple node to multiple node) arrangements.

In general, a node is a processing location in a computer network. More particularly, in accordance with the various implementations described herein, a node is a process or device that is uniquely addressable via a network. By way of example, and not limitation, individually addressable computing devices, groups or clusters of computing devices that have a common addressable controller, addressable peripherals, such as addressable printers, and addressable switches and routers, as well as processes executing on such devices, are all examples of nodes.

The operating environment 100 supports many communication scenarios that are frequently carried out over a network. Exemplary scenarios include, but are not limited to, node A 102 accessing a resource from node B 104, or node A 102 providing a service to node B 104. For example, a user of node B 104 may access a commercial Web site at node A 102 to buy books from the Web site.

In the exemplary operating environment 100, data communication between node A 102 and node B 104 is carried out by exchanging messages between node A 102 and node B 104. When in a message exchange, node A 102 and node B 104 are designed to receive and/or transmit messages according to certain data formats and/or follow certain protocols. Node A 102 and node B 104 each have policies that may be used to express the data formats and protocols that can or should be used during message exchange.

More generally, a policy is an informal abstraction expressing properties of a node. In the implementation of FIG. 1, a policy expression includes one or more policy assertions (also referred to as 'assertions'). An assertion represents an individual preference, requirement, capability, or other property that a node (e.g., Node A 102) may, or in some circumstances, must comply with in order to communicate with another node (e.g., Node B 104).

For example, node A 102 includes an A input policy 108 and an A output policy 110. The A input policy 108 expresses one or more assertions related to messages that are received by, or input to, node A. The A output policy 110 expresses one or more assertions related to messages that are transmitted, or output by, node A. Similarly, node B 104 includes B input policy 112 and B output policy 114.

As shown in FIG. 1, the policies are illustrated as being implemented in one or more documents; however, policies need not be stored in documents, but rather, can be implemented in other forms, such as, stored in memory, dynamically created or retrieved from another node, or otherwise. A policy may be expressed in a markup language, such as, but not limited to, Hypertext Markup Language (HTML) and Extensible Markup Language (XML). In addition, an input policy and an output policy may be combined into a single policy.

To further illustrate the concept of a policy, a policy can specify message encoding formats, security algorithms, tokens, transport addresses, transaction semantics, routing requirements, and other properties related to message transmission or reception. Implementations of policies described herein specify one or more assertions, which can aid two or more nodes in a message exchange in determining if their requirements and capabilities are compatible. The assertions may be grouped and related to each other in some way. A group of one or more assertions may be referred to as a policy expression.

Accordingly, A input policy 108 includes a number of groups of input assertions, including a first policy expression 116 and a second policy expression 118. Similarly, A output policy 110 includes a number of groups of output assertions, including a first policy expression 120 and a second policy expression 122. Likewise, B input policy 112 includes a number of groups of input assertions, including a first policy expression 124 and a second policy expression 126; and B output policy 114 includes a number of groups of output assertions, including a first policy expression 128 and a second policy expression 130.

Expression (1) shown below illustrates how the assertions in A input policy 108 can be related in a Boolean manner:

$$\text{AInputPolicy}:(\mathbf{A1} \otimes \mathbf{A2} \otimes \mathbf{A3}) \oplus (\mathbf{A4} \otimes \mathbf{A5} \otimes \mathbf{A6}). \quad (1)$$

Expression (1) indicates that in order to comply with the A input policy 108, a node attempting to send a message to node A can satisfy either assertion A1, assertion A2, and assertion A3 together, or assertion A4, assertion A5, and assertion A6 together, but typically not both groups of assertions. The manner in which a node, such as node B 104, may use the A input policy 108 to communicate with node A 102 is discussed further below. Other, non-Boolean, expressions can be used to express relationships among assertions.

The number of assertions shown in policy expressions 116, 118, 120, 122, 124, 126, 128, and 120 is purely exemplary for illustrative purposes only. The numbers assigned to the assertions shown in FIG. 1 (e.g., A1, A2, . . . , B13) are not intended to imply that the various assertions shown are different or the same. Indeed, frequently during operation, some assertions at node A 102 will match some assertions of node B 104, and some assertions at node A 102 will be different from some assertions at node B 104. A particular example of assertions is shown in FIG. 2, and is discussed further below.

Node A 102 includes a policy generator 132, a policy retriever 134, and a message generator 136. The policy generator 132 generates the A input policy 108 and the A output policy 110. The policy generator 132 can send either or both of the A input policy 108 and/or the A output policy 110 to node B 104 or other intermediate nodes in the network 106. One particular implementation of the policy generator 132 advertises the A input policy 108 and/or the A output policy 110, for example, by making A input policy 108 and/or the A output policy 110 publicly available either on node A 102 or some other node on the network 106.

The policy retriever 134 retrieves policies from other nodes, such as node B 104 or intermediate nodes on the network 106. The policy retriever 134 can request a policy from another node, receive the policy, and may cache a received policy in memory for later use. The policy retriever 134 can also retrieve a policy that was previously stored in local memory on node A 102. The policy retriever 134 also performs functions related to determining whether a retrieved policy is compatible with a local policy and/or selecting a compatible policy expression in a retrieved policy.

The message generator 136 at node A 102 generates messages that conform to one or more assertions in the B input policy 112 of node B 104. For example, the message generator 136 may encrypt, format, or encode a message as specified by input assertions in the B input policy 112. As another example, the message generator 136 may transmit the message according to a compliant protocol (e.g., SOAP 1.1) specified in the B input policy 112. As yet another example, the message generator 136 may apply a user signature or password to the message in accordance with the B input policy 112. The output of the message generator 136 is a policy-compliant message complying with the B input policy 112.

Similarly, node B 104 includes a policy generator 138, a policy retriever 140, and a message generator 142. The policy generator 138 has functionality similar to that of the policy generator 132 in node A 102. Thus, if node A's 102 policy retriever 134 requests a policy from node B 104, node B's 104 policy generator 138 can responsively transmit one or more of the B input policy 114 and the B output policy 116 to the policy retriever 134 at node A 102.

The policy retriever 140 at node B 104 has functionality similar to the functionality described above with respect to policy retriever 134 at node A 102. The message generator 142 at node B 104 formats and transmits messages to node A 102 in accordance with one or more assertions in the input policy 108 of node A 102.

Node A 102 can retrieve and use a policy of node B 104 to construct a protocol with which to communicate to node B 104, and vice versa. This may involve a selection process where a node selects one group of assertions from the policy of the other node. For example, node B 104 retrieves (via the retriever 138) and analyzes the A input policy 108 to determine if node B can comply with at least one of the policy expressions, the first policy expression 116, the second policy expression 118, etc., in the A input policy 108. The determination may involve solving a relational equation such as expression (1) above. Other exemplary methods for determining whether node B 104 can comply is discussed below with respect to operations shown in FIG. 3.

Another implementation of the operating environment 100 includes a third party service or tool that compares policies of two or more nodes to determine whether they are compatible. Such a service or tool may operate on node A 102, node B 104, or an intermediate node on the network 106. Thus, a service may read B output policy 114 and read A input policy 108 and determine if the policies are compatible. For example, the service may determine that the policy expression 116 is compatible with the policy expression 128. The service can notify node A 102 and node B 104 as to the results of the compatibility determination.

FIG. 2 illustrates an exemplary policy 200 that may be used by a node to dynamically construct a protocol to facilitate communication with one or more other nodes. The exemplary policy 200 is in Extensible Markup Language (XML). As such, the exemplary policy 200 includes a number of tags, starting with an open bracket (<) and ending with a close bracket (/>).

As discussed above, a policy includes one or more assertions that can be grouped into one or more policy expressions. Grouping assertions can involve applying a relationship operator to the group. A relationship operator specifies a relationship between or among assertions in a group. Various other attributes, assertion types, and operators can be applied to an assertion. The exemplary policy 200 illustrates just a few exemplary attributes, assertion types, and operators.

Other exemplary attributes, assertion types, and operators are discussed further below.

The exemplary policy 200 includes two policy expressions bounded by a <wsp: ExactlyOne> operator 202. A first policy expression 204 expresses a security profile (i.e., <wsse:SecurityToken>) consisting of security specific policy assertions. As shown in FIG. 2, the first policy expression 204 specifies "Kerberos Authentication" (i.e., <wsse: TokenType>wsse: Kerberosv5TGT </wsse:TokenType>) and "Privacy" (i.e., <wssx: Privacy/>).

A second policy expression 206 specifies password authentication (<wsse:TokenType>wsse:UsernameToken</wsse:TokenType>), an integrity algorithm (i.e., <wsse:Algorithm Type="wsse:AlgEncryption" URI="http://www.w3.org/2001/04/xmlenc#3des-cbc"/>), and an audit trail (i.e., <wssx:Audit/>). The integrity algorithm specifies a particular encryption algorithm along with a Uniform Resource Identifier (URI) indicating a network location from which the encryption algorithm can be obtained.

The <wsp:ExactlyOne> operator 202 bounding the first policy expression 204 and the second policy expression 206 indicates that one and only one of the groups of assertions can be selected by a node; i.e., the first policy expression 204 and the second policy expression 206 are alternatives.

Bounding the first policy expression 204 is an "All" operator 208. The All operator 208 indicates that all of the assertions in policy expression 204 must be practiced by a node if the policy expression 204 is selected. Similarly, the second group 206 is bounded by another "All" operator 210, which indicates that all of the assertions in the second policy expression 206 must be practiced if the second policy expression 206 is selected.

Each assertion may be associated with a usage type or attribute. The usage attribute stipulates how the assertion should be interpreted in relation to the overall policy. To illustrate, a privacy assertion could, for example, specify that privacy guarantees will be provided for information exchanged between two Web services, while an encryption assertion could specify a requirement for encryption. The privacy assertion and the encryption assertion differ, in that the privacy assertion has no externally visible manifestation, while the encryption assertion is externally manifested (i.e., the encryption assertion indicates a requirement on messages being sent to and from the Web services). The privacy assertion is simply a declaration that the Web services will guarantee some level of privacy to the sender, while the encryption assertion requires cooperation between the two Web services. Because usage can differ between assertions, a usage attribute can be used to characterize the difference. Various exemplary usage attributes are discussed below.

Accordingly, within the All operator 208 tag, and the All operator 210 tag, usage attributes indicate that the bounded assertions are "required". In an alternative implementation, each assertion tag bounded by the All operator 208, and the All operator 210, could individually specify the usage attribute.

Also in the All operator 208 tag, and the All operator 210 tag, preference values are shown that indicate a level of preference of the corresponding groups. In the exemplary policy 200, the preference value of the first group 204 is "100", while the preference value for the second policy expression 206 is "1", meaning that the first policy expression 204 is preferred over the second group 206.

To capture the nature of differences among various assertions, five exemplary usage attributes are used in one particular implementation of a policy: Required, Optional, Rejected, Observed and Ignored. These exemplary usage attributes are shown and described below in Table 1:

TABLE 1

Exemplary Usage Attributes

| Attribute | Meaning |
|---|---|
| Required | The assertion must be applied to the subject. If the subject does not meet the criteria expressed in the assertion a fault or error will occur. |
| Rejected | The assertion is explicitly not supported and if present will cause failure. |
| Optional | The assertion may be made of the subject but it is not required to be applied. |
| Observed | The assertion will be applied to all subjects and requesters of the service are informed that the policy will be applied. |
| Ignored | The assertion is processed, but ignored. That is, it can be specified, but no action will be taken as a result of it being specified. Subjects and requesters are informed that the policy will be ignored. |

With regard to Table 1, a policy subject is a node to which a policy can be bound. Other exemplary operators and containers, in addition to the "All" operator and the "ExactlyOne" operator, are shown and described below in Table 2:

TABLE 2

Exemplary Assertion Operators/Containers

| Operator/Container | Meaning |
|---|---|
| Policy | A policy expression that is the top level container for the set of policy operators and assertions. |
| ExactlyOne | An ExactlyOne operator may contain one or more policy assertions, references, or operators. The ExactlyOne operator requires that exactly one of the bounded operands be satisfied. |
| All | The All operator may contain one or more policy assertions, references, or operators. The All operator requires that every one of the bounded operands be satisfied. |
| OneOrMore | The OneOrMore operator may contain one or more policy assertions, references, or operators. The OneOrMore operator requires that at least one of the bounded operands be satisfied. |

The exemplary attributes, operators, and containers described in Table 1 and Table 2 are in no way intended to limit a particular policy implementation to the attributes, operators, and containers shown. Those skilled in the art may readily recognize and develop other attributes, operators, and containers that are useful in a particular implementation, which are within the scope of the present application.

Some examples of assertions that may be made related to protocols are Simple Object Access Protocol (SOAP) 1.1, SOAP 1.0, HyperText Transport Protocol (HTTP) 1.1, HTTP over Secure Sockets Layer (SSL) (HTTPS), Pipelined HTTP (PHTTP), TCP/IP, FTP, just to name a few.

It will be appreciated that by using a policy, such as policy 200, a node can specify capabilities, requirements, the number of messages and their form, security measures, reliable messaging, transactions, routing, and other parameters relevant to a message exchange. In addition, policies are extensible, whereby a policy can be extended to include, for example, newly available policy expressions.

Policies are composable, which means that policy expressions having one or more assertions can be inserted into or removed from a policy. Thus, for example, the SOAP header model and Web Services Specifications (WS-specs) outline a composable model, thereby making SOAP headers and WS-specs suitable technologies for implementing a policy scheme outlined herein. In addition, the policy schemes described herein enable nodes to specify a flexible set of protocols at runtime using elements from web services, such as those described by WS-specs.

Exemplary Operations in a Single Node to Single Node Message Exchange

Described herein are exemplary methods for implementing dynamic protocol instruction in a network environment. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement dynamic protocol construction in a network environment.

Figure 3:
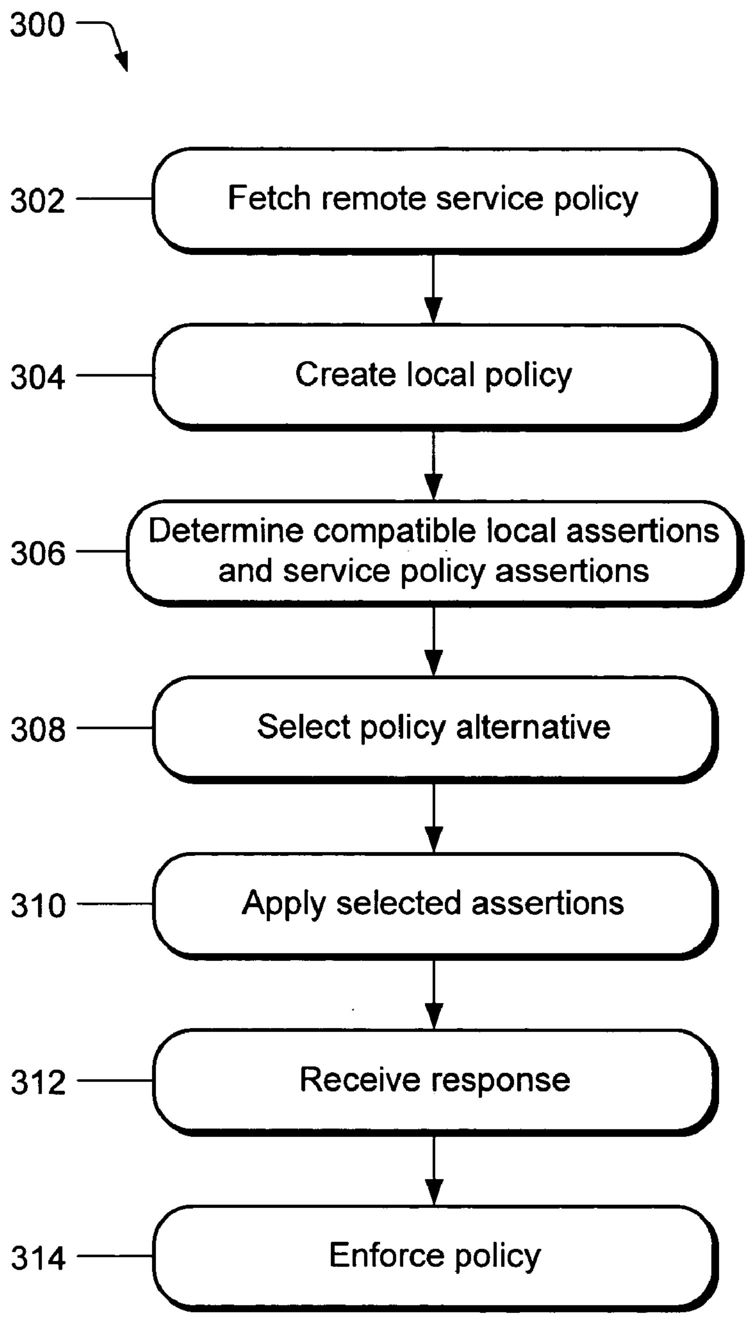
FIGS. 3-4 are flowcharts illustrating exemplary operations to implement dynamic protocol construction.

FIG. 3 illustrates a dynamic protocol construction operation flow or algorithm 300 that would be performed by an initiator of a message exchange. For example, a client accessing a server may execute the operations shown in the operation flow 300. As another example, a first peer attempting to contact a second peer in a peer-to-peer environment may execute the operations shown in FIG. 3 to establish a protocol for communication.

The exemplary operations shown and discussed with respect to the dynamic protocol construction operation flow 300 are with respect to a client/server environment, but it is to be understood that the operation flow 300 is generally applicable to any computing device that is initiating a message exchange. In the following description of the operation flow 300, a local policy refers to a policy related to the client and a remote service policy refers to a policy related to a service executing at the server.

In a fetching operation 302, the client fetches the remote service policy characterizing capabilities and/or requirements of the server. The fetching operation 302 generally involves retrieving the remote service policy and may include caching the retrieved service policy at the client for later use. In one implementation of the fetching operation 302, the client sends a request to the server requesting the remote service policy. The client may receive in response an input service policy or an output service policy, or both.

Another implementation of the fetching operation 302 receives the policy or policies incrementally from the server. For example, the client may receive a first set of assertions from the server, followed by a second set, and so on. The client may receive logically related groups of the policy assertions incrementally.

In yet another implementation of the fetching operation 302 the client does not fetch the remote service policy from the server related to the remote service policy, but rather the client receives the remote service policy from an advertising server. In this implementation, the remote server advertises the remote server policy on the advertising server, from which the client can access the remote service policy. The client may receive the remote service policy incrementally or all at once.

In yet another implementation of the fetching operation 302, the client checks a cache memory on the client for a cached copy of the remote service policy. If the client finds the remote service policy in the client cache, the client may or may not request the remote service policy from the remote server. In this implementation, the client may check the age of the cached remote service policy (e.g. by comparing a date on the cached remote service policy to a predetermined date) and if the age is greater than a target date, the client may request a new remote service policy from the remote server.

The act of fetching policy may itself be subject to protocol construction. This may involve an initial "bootstrap" protocol, which is agreed to by endpoint nodes based on out of band mechanisms. All nodes that fetch policy will need to agree to use some common protocol or protocols to exchange policy documents. This is the "fetch policy" policy. For example, the nodes may agree to the "fetch policy" policy defined in a paper specification, email each other the "fetch policy" policy for each service, post the "fetch policy" policy on a website for downloading, or advertise the "fetch policy" policy as part of the mechanism used to advertise the service itself. As an example of the latter, when a service is advertised in a Universal Description, Discovery and Integration (UDDI) repository, the "fetch policy" policy for the service could be stored with the service address and other capabilities.

A creating operation 304 creates a local (i.e., client) policy. As discussed above, the local policy can include a number of assertions related to input and output capabilities and requirements of the client. As such, one implementation of the creating operation 304 creates one or more policies based on local hardware and software capabilities, and configuration decisions made by the client implementer and administrator deploying the client. The creating operation 304 preferably creates a local input policy and a local output policy related to the client.

A determining operation 306 determines whether the remote service policy includes at least one set of assertions that are compatible with client capabilities. In one implementation of the determining operation 306, the client identifies one or more groups of assertions in the remote input service policy that intersect with the local (i.e., client) output policy. An intersection between two policies occurs when a group of assertions in the remote input service policy matches or is a subset of a group of assertions in the local output policy.

A selecting operation 308 selects one group of assertions from the groups of assertions identified in the determining operation 306, if more than one group of compatible assertions was identified. The selecting operation 308 can consider "preference" values in either the local policy or the remote service policy, or both, to determine if one group of assertions is preferred over another group, and select the preferred group.

An implementation of the selecting operation 308 includes configuring software to enable the software to send and receive messages that conform to the selected policy. Configuring the software may involve calling various software modules and/or accessing data stores to obtain security tokens or other data related to the selected policy. The implementation-specific details related to implementing a particular assertion are defined by the specification for the assertion.

An applying operation 310 applies the selected assertions from the selecting operation 308. In one implementation, the applying operation 310 sends a request message to the server. The request message includes an underlying message that the client is sending to the server. For example, if the client is attempting to order books from the server, the request message is a book order message, having service-recognizable syntax and semantics corresponding to a book order.

The applying operation 310 appends a header having the selected remote service input policy assertions and the local input policy assertions to the underlying message. By appending the remote service input policy assertions, the client conveys to the remote server the protocols and data formats or other properties that will be used by the client to communicate with the server. By appending the local input policy assertions to the underlying message, the client conveys to the server the properties of the client by which the server can communicate with the client.

A receiving operation 312 receives a response from the server. The response from the server is a combination of the underlying response to the client's previous underlying request message and a selected group of assertions from the local input policy. The client is thereby notified about which of the client's communication properties the server will be using to communicate with the client.

An enforcing operation 314 enforces the policy selected by the server. An implementation of the enforcing operation 314 ensures that messages received from the server conform to the input assertions that the server selected previously. Thus, for example, if one of the selected input assertions requires a particular type of encryption, the client will check to see that messages received from the server are encrypted accordingly.

Figure 4:
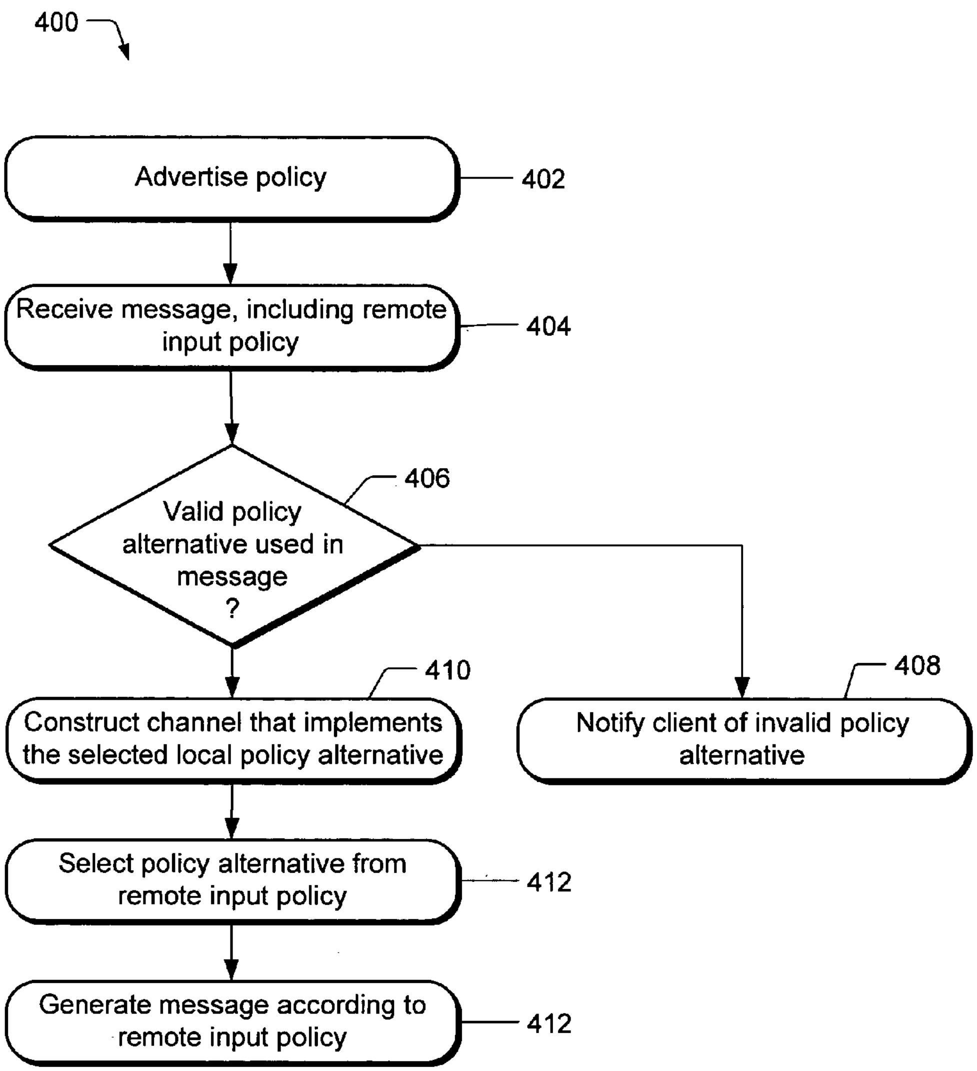

FIG. 4 illustrates another dynamic protocol construction operation flow or algorithm 400, which is applicable to a server in a client/server environment. As with the operation flow 300 discussed above, the dynamic protocol construction operation flow 400 of FIG. 4 is not limited to a client/server environment. Rather, the dynamic protocol construction operation flow 400 is applicable to any environment in which a node is the recipient of a request to enter into a message exchange.

The dynamic protocol construction operation flow 400 is described from the perspective of the server. As such, the local policy is the policy related to a service executing at the server and the remote policy is the policy related to the client.

An advertising operation 402 advertises the local policy of the server. Advertising the local policy involves making the local policy known to at least one other node, and in this particular case, the client. One implementation of the advertising operation generates the local policy and transmits all of the local policy to the client in response to a client request for the local policy.

Another implementation of the advertising operation 402 generates the local policy and incrementally transmits the local policy to the client. In this implementation, the server may receive a request from the client for each incremental portion of the local policy, and responsively transmit the requested portion.

Yet another implementation of the advertising operation 402 generates the local policy and stores the local policy on an advertising server, from which the client can retrieve the local policy.

In yet another implementation of the advertising operation 402, a copy of the local policy is delivered to a third party service that reads the local policy and the client policy to determine if the two policies are compatible.

A receiving operation 404 receives a message from the client. The message includes an underlying message and a header indicating a group of assertions from the local policy that the client will be using to communicate with the server. The header also provides a remote input policy indicating the client's capabilities and requirements related to receiving messages.

A determining operation 406 determines whether the message received in the receiving operation 404 used a valid policy expression. The determining operation 406 checks that the message conforms to the selected group of assertions in the local policy. Thus, for example, the determining operation 406 may determine whether the message was encrypted according to an encryption format specified in the local policy. If the message does not conform to the selected group of assertions, then the operation 400 branches "NO" to a notifying operation 408, in which the client is notified that the message does not conform to a valid policy expression that a valid policy expression was applied to the message, the operation 400 branches "YES" to a constructing operation 410. The constructing operation 410 constructs a receive channel that implements the selected policy expression.

A selecting operation 412 selects a policy expression from the remote client's input policy. As indicated above, the selection of a policy expression can be based on the service's capabilities or preferences specified in the input policy and other factors. After the selecting operation 412 selects a policy expression, a generating operation 414 generates a reply message to the client based on the selected policy expression. The reply message typically includes an underlying response message and an indication of the client input policy expression that the service selected for communication with the client.

Exemplary Multiple Node Environment and Operations

The operations described above pertain to environments in which one node is communicating with another node using dynamic protocol construction. Often, in actual operation, messages from one node are routed through other nodes before reaching the destination node. For example, in a corporate environment, messages may be routed through a firewall, a main server, and finally to a recipient's computer. Each node in the path may have policies related to data protocols that are preferred, available, and/or required by the node.

Figure 5:
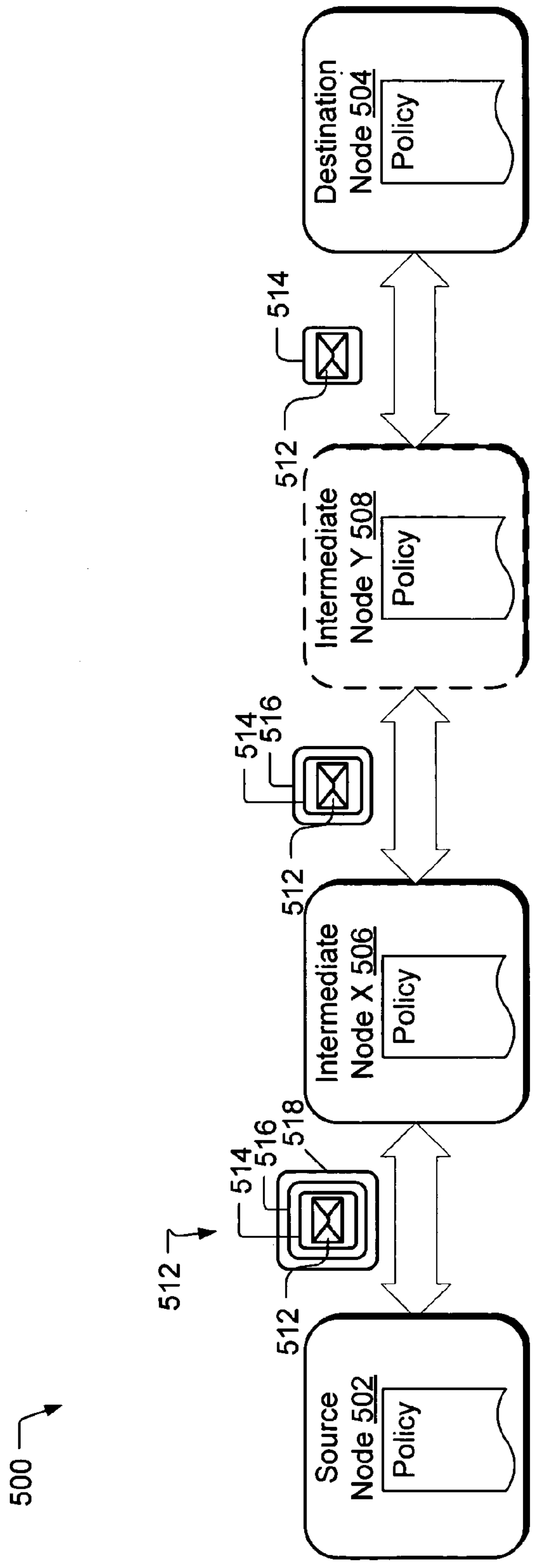
FIG. 5 illustrates an exemplary operating environment having multiple nodes in a communication path in which dynamic protocol construction can be implemented.

FIG. 5 illustrates an exemplary multiple node communication environment 500 including a source node 502 and a destination node 504. A message exchange occurs between the source node 502 and the destination node 504, via two intermediate nodes, intermediate node X 506, and intermediate node Y 508. Source node 502, destination node 504, intermediate node X 506, and intermediate node Y 508 each have a policy. The policy at each node can include one or more policies (e.g., input policy, output policy), as discussed above. In general, the source node 502 retrieves policies in order from closest node to farthest node, and applies policies to a message in order from farthest node to closest node, as is illustrated by an exemplary scenario below.

Source node 502 generates a message intended for the destination node 504. As discussed above, source node 502 retrieves the policy of the destination node 504, in order to select a policy expression, and apply the selected policy expression to the message. However, in order to retrieve the policy of the destination node 504, the source node 502 must go through intermediate node X 506 and intermediate node Y 508.

In the exemplary scenario described with respect to the environment 500, it is assumed that source node 502 initially has no information about (i.e., is not aware of) the presence of intermediate node Y 508, but is aware of intermediate node X 506. In order to retrieve the policy from destination node 504, the source node 502 first requests the policy from intermediate node 506. The source node 502 selects a policy expression from the policy related to intermediate node X 506 and applies the selected policy expression to a policy retrieval message.

The policy retrieval message is a request for the policy from the destination node 504. Included with the policy retrieval message is the policy related to the source node 502. The intermediate node X 506 receives the policy retrieval message, including the policy of the source node 502, and validates the message, as discussed above, by checking to see that a valid policy expression was applied to the policy retrieval message. If the policy retrieval message is valid, the intermediate node X 506 requests the policy from the destination node 504.

The intermediate node X 506 puts the policy of the destination node 504 into a message for the source node 502. This includes applying the policy of the source node 502 to the message so that the message to the source node 502 conforms to the policy of the source node 502. The source node 502 receives and validates the message and reads the policy of the destination node 504.

In this scenario, the policy from the destination node 504 specifies another intermediate node Y 508 that should be included in the communication path. A policy can include one or more intermediate nodes. If more than one intermediate node is specified in a policy, the policy should also specify an order of the intermediate nodes in the communication path. The order of intermediate nodes is important for the order of retrieving and applying the policies of the intermediate nodes. In this scenario, only one intermediate node, intermediate node Y 508, is included in the policy from the destination node 504.

The source node 502 generates another policy retrieval message including a request for the policy from intermediate node Y 508. As before, the source node 502 applies the policy of the intermediate node X 506 to the policy retrieval message. The intermediate node X 506 receives and validates the message and requests the policy from the intermediate node Y 508. When the intermediate node X 506 receives the policy from the intermediate node Y 508, the intermediate node X 506 creates a message including the policy from the intermediate node Y 508. After applying source node's 502 policy to the message, the intermediate node X 506 sends the message to the source node 502.

Upon receipt of the message from the intermediate node X 506, the source node 502 has all the policies from the nodes in the communication path to the destination node 504. The source node 502 reads the policies and selects policy expressions from each one of the policies. The selected policy expressions include the data protocols, formats, etc. that the source node 502 will apply to messages sent to the destination node 504.

The selected policy expressions are applied to an underlying message 510 in order of farthest node to closest node, relative to the source node 502. The underlying message 510 is the message that the source node 502 ultimately wants delivered to the destination node 504. The underlying message 510 is any message recognizable by the destination node 504, and may include application-specific semantics or syntax. For example, the underlying message 510 may be a book order.

In the exemplary scenario, first the policy expression from the policy related to the destination node 504 is applied to the underlying message 510; i.e., the underlying message 510 is conformed in accordance with the policy of the destination node 504 so that the message is policy-compliant. Next, the policy expression from the policy related to the intermediate node Y 508 is applied to the message. Lastly, the policy expression from the policy related to the intermediate node Y 506 is applied to the message. After all the policies are applied the underlying message 510, the message is referred to as a policy-compliant message 512.

Thus, the policy-compliant message 512 that is sent from the source node 502, may be viewed as a message with three levels of policy application. The policy-compliant message 512 includes an inner level of policy application 514 that relates to the destination node 504 and will be received and validated last in the message exchange. The policy-compliant message 512 includes a middle level of policy application 516 related to the intermediate node Y 508 and will be received and validated next-to-last in order. The policy-compliant message 512 includes an outer level of policy application 518 related to the intermediate node X 508 and will be received and validated first in the message exchange.

As the policy-compliant message 512 passes through each node, the outermost level of policy application is removed from the policy-compliant message 512. Thus, intermediate node X 506 removes outer policy application 518, and intermediate node Y 508 removes middle policy application 516. Intermediate node X 506 and intermediate node Y 508 forward the message on to the next node in the path after removing and validating the associated policy application. The message received by the destination node 504 is the underlying message 510 with the inner policy application 514. The destination node 504 receives the message 510 and validates the policy application 512 with respect to valid policy expressions in the policy for the destination node 504.

Figure 6:
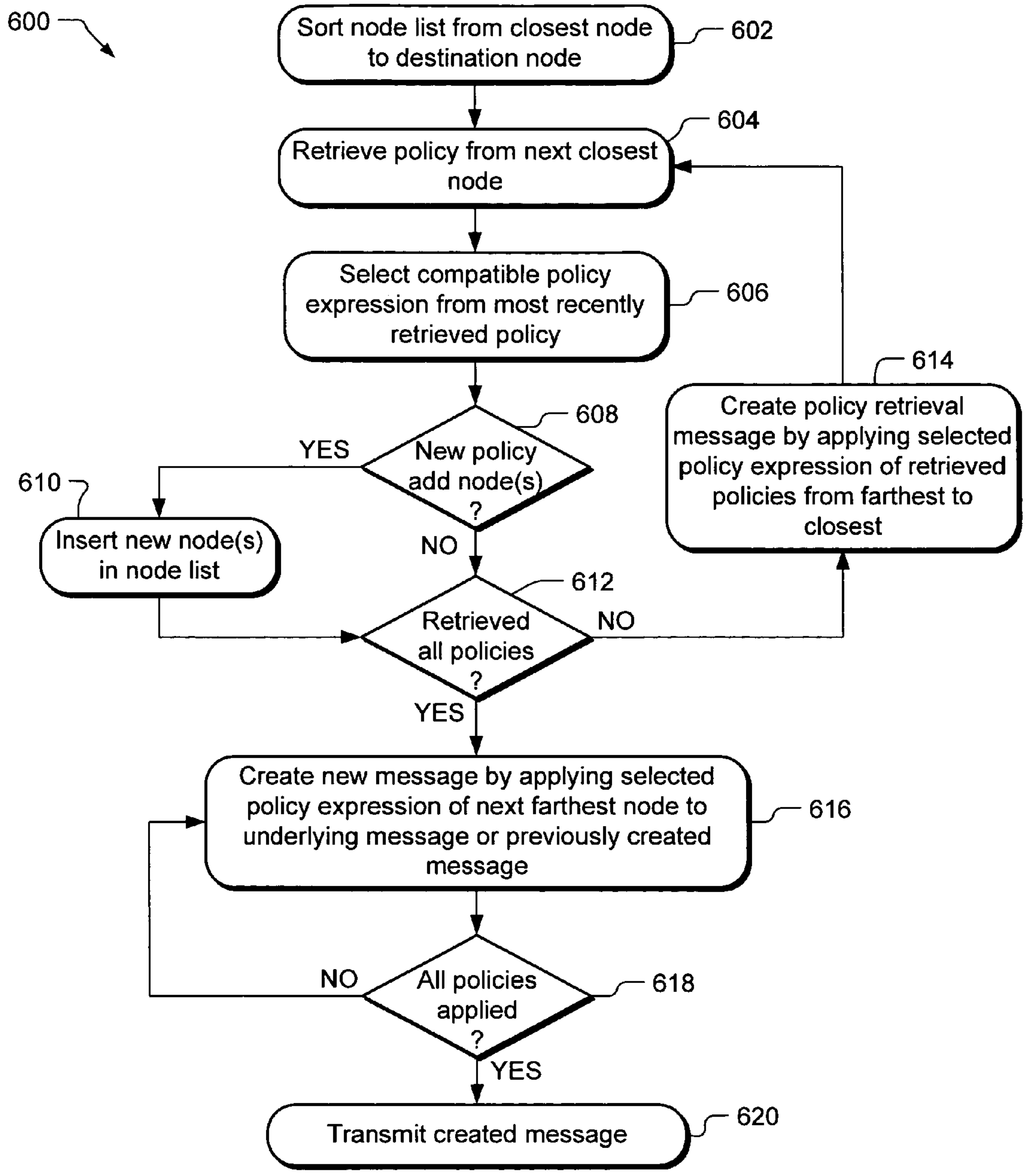
FIG. 6 is a flowchart illustrating exemplary operations for implementing dynamic protocol construction across multiple nodes in a communication path.

FIG. 6 illustrates a dynamic protocol construction operation flow or algorithm 600 for dynamically constructing protocols among multiple nodes. The operation flow 600 can be executed by a source node, such as source node 502 (FIG. 5), to retrieve multiple policies and apply the multiple policies to a message for transmittal to a destination node, such as destination node 504 (FIG. 5).

A sorting operation 602 sorts a list of nodes from closest node to farthest node, relative to the source node. It is to be understood that the terms "close" and "far" do not necessarily mean physically "close" or "far" from a node. "Close" and "far" in this context pertain to how many nodes removed from another node in a message communication. Thus, for example, the second node to receive a message is farther from the original sending node than the first node to receive the message is from the original sending node.

A retrieving operation 604 retrieves a policy related to the first (i.e., next closest) node on the list of nodes. One implementation of the retrieving operation 604 sends a request to the first node for the first node's policy, in a manner similar to that described above. Alternatively, the retrieving operation 604 may retrieve the policy from a local cache, or advertising server that stores the policy. The policy may be retrieved incrementally or all at once, as discussed above.

After the policy is received from the first node, a selecting operation 606 selects a compatible policy expression from the retrieved policy. One implementation of the selecting operation 606 compares the retrieved policy with a policy at the source node to identify a matching policy expression.

A determining operation 608 determines whether the retrieved policy specifies any additional intermediate node(s) in the communication path. The determining operation 608 reads the retrieved policy and identifies any routing assertions that may be specified in the retrieved policy.

If the determining operation 608 determines that additional intermediate node(s) are specified, the operation flow 600 branches 'YES' to an inserting operation 610. The inserting operation 610 inserts the additional intermediate node(s) in the node list. Any additional intermediate nodes added to the node list immediately proceeding the node whose policy added them. If there is more than one node being added, then either their ordering is specified in the policy or there is no ordering requirements and the node are added in an arbitrary order. An added intermediate node may therefore become the 'next closest node' during a subsequent execution of the retrieving operation 604.

After the additional intermediate node(s) are inserted on the node list, another determining operation 612 determines whether anymore nodes are present in the node list for which a policy has not been retrieved. Likewise, if the determining operation 608 determines that no additional intermediate node(s) are specified in the retrieved policy, the operation flow 600 branches 'NO' to the determining operation 612.

If the determining operation 612 determines that a policy remains to be retrieved from a node on the node list, the operation 600 branches 'NO' to a creating operation 614. The creating operation 614 creates a request for the policy of the next closest node remaining on the node list. Creating the request involves applying the selected policy expressions from the retrieved policies in an order corresponding to the order of nodes in the message exchange. Specifically, the selected policy expression of the farthest node (from which a policy has been retrieved) is applied to the request first, then the selected policy expression of the next farthest node, and so on.

The retrieving operation 604 then sends the created policy request to the first node in the list. The first node in the list removes a policy level (related to the first node) from the message and forwards the request message on to the next node. The next node receives the policy request message and, if the request is for the node's policy, that node sends back its policy. Otherwise, the request is forwarded on to the next node.

The retrieving operation 604, the selecting operation 606, the determining operation 608, the inserting operation 610, the determining operation 612, and the creating operation 614 continue until the policy of each node in the multiple-node communication path is retrieved and compatible policy expressions are selected from each of the policies. Thus, a compatible policy expression is selected corresponding to each of the policies and each of the nodes. An exemplary implementation of the operations 602-614 is given below in pseudo code:

```
Message msgToBeSent;
// Form msgToBeSent
foreach (NodeForPolicy in
        msgToBeSent.GetNodeList(orderFromClosestToUltimateReceiver))
    Message msgToRetrievePolicy =
        FormPolicyRetrievalMessage(NodeForPolicy, msgToBeSent)
```

-continued

```
Bool reachedNodeForPolicy = false
foreach (NodeForApplication in
    msgToBeSent.GetNodeList(orderFromUltimateReceiverToClosest))
        if (!reachedNodeForPolicy)
            if (NodeForPolicy != NodeForApplication)
                continue
            reachedNodeForPolicy = true
            continue
        ApplyPolicy(NodeForApplication, msgToRetrievePolicy)
StorePolicy(SendMessage(msgToRetrievePolicy))
```

The selected policy expressions associated with each node in the node sequence will be applied to the message in order of farthest to closest. A creating operation 616 creates a new message by applying the selected policy expression corresponding to the next farthest node (starting with the farthest node) on the node list to a message to be sent to the destination node. The first time the creating operation 616 executes, the first selected policy expression is applied to an underlying message; subsequent executions of the creating operation 616 apply another selected policy expression to the previously created message. Thus, the creating operation 616, when iteratively executed, generates a message with one or more levels of policy applied to the message.

A determining operation 618 determines whether all the policies corresponding to all the nodes in the node list have been applied. If not all the policies have been applied, the operation 600 branches 'NO' to the creating operation 616, which applies another level of policy corresponding to the next node on the node list.

If all of the selected policy expressions have been applied, the operation 600 branches 'YES' to a transmitting operation 620. The transmitting operation 620 transmits the finally created message, having all levels of policy applied. Each of the levels of policy is removed upon receipt by the node corresponding to that level of policy, and the message is sent on to the next node in the communication path, until the message reaches the destination node.

Exemplary Computing Device

Figure 7:
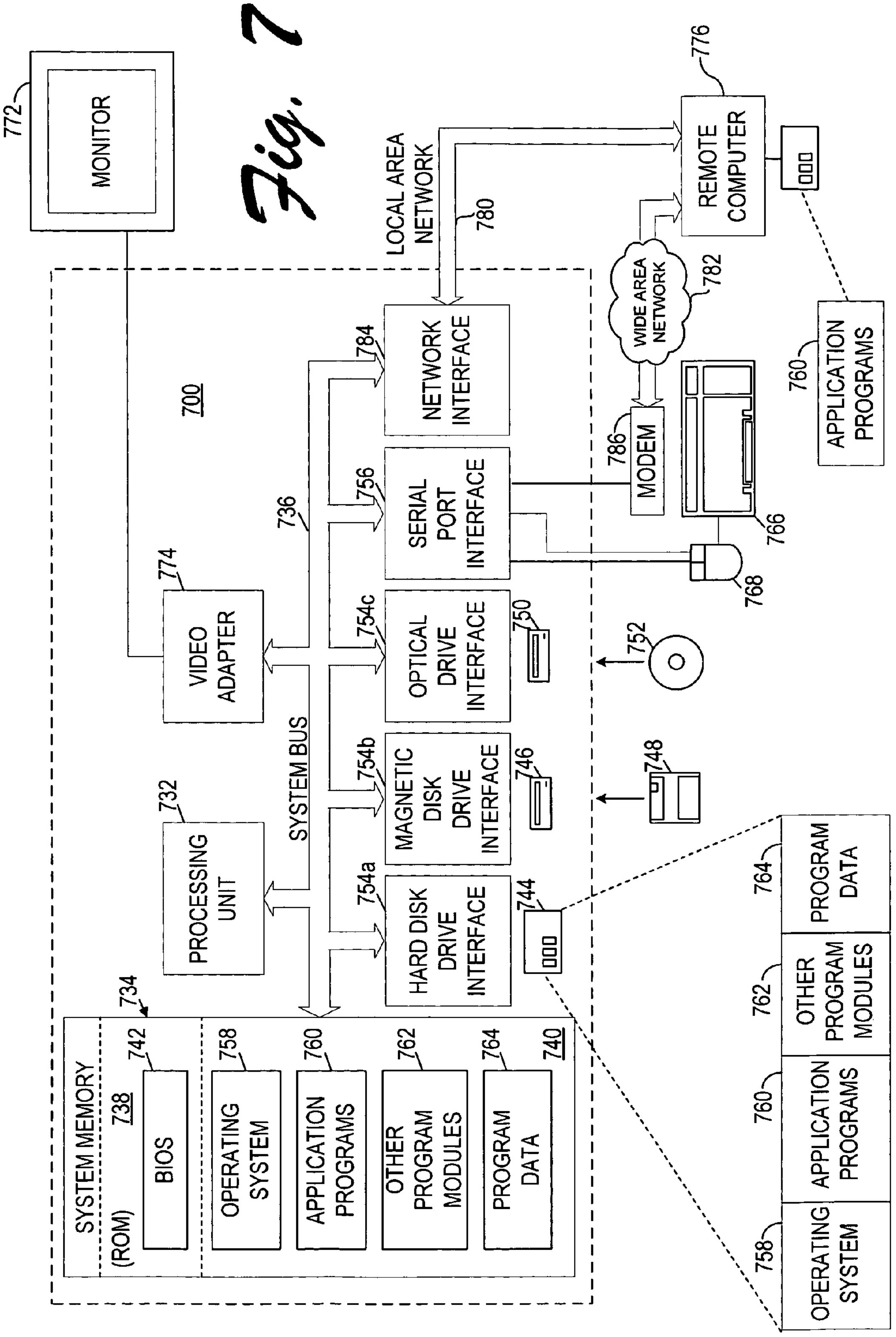
FIG. 7 is a schematic illustration of an exemplary computing device that can be utilized to implement dynamic protocol construction.

FIG. 7 is a schematic illustration of an exemplary computing device 700 that can be utilized to implement a host. Computing device 700 includes one or more processors or processing units 732, a system memory 734, and a bus 736 that couples various system components including the system memory 734 to processors 732. The bus 736 represents one or more of any of several types of bus structures, including a memory bus or memory controller, a peripheral bus, an accelerated graphics port, and a processor or local bus using any of a variety of bus architectures. The system memory 734 includes read only memory (ROM) 738 and random access memory (RAM) 740. A basic input/output system (BIOS) 742, containing the basic routines that help to transfer information between elements within computing device 700, such as during start-up, is stored in ROM 738.

Computing device 700 further includes a hard disk drive 744 for reading from and writing to a hard disk (not shown), and may include a magnetic disk drive 746 for reading from and writing to a removable magnetic disk 748, and an optical disk drive 750 for reading from or writing to a removable optical disk 752 such as a CD ROM or other optical media. The hard disk drive 744, magnetic disk drive 746, and optical disk drive 750 are connected to the bus 736 by appropriate interfaces 754*a*, 754*b*, and 754*c*. The drives and their associated computer-readable media provide nonvolatile storage of computer-readable instructions, data structures, program modules and other data for computing device 700. Although the exemplary environment described herein employs a hard disk, a removable magnetic disk 748 and a removable optical disk 752, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 744, magnetic disk 748, optical disk 752, ROM 738, or RAM 740, including an operating system 758, one or more application programs 760, other program modules 762, and program data 764. A user may enter commands and information into computing device 700 through input devices such as a keyboard 766 and a pointing device 768. Other input devices (not shown) may include a microphone, joystick, game pad, satellite dish, scanner, or the like. These and other input devices are connected to the processing unit 732 through an interface 756 that is coupled to the bus 736. A monitor 772 or other type of display device is also connected to the bus 736 via an interface, such as a video adapter 774.

Generally, the data processors of computing device 700 are programmed by means of instructions stored at different times in the various computer-readable storage media of the computer. Programs and operating systems may be distributed, for example, on floppy disks, CD-ROMs, or electronically, and are installed or loaded into the secondary memory of the computing device 700. At execution, the programs are loaded at least partially into the computing device's 700 primary electronic memory.

Computing device 700 may operate in a networked environment using logical connections to one or more remote computers, such as a remote computer 776. The remote computer 776 may be a personal computer, a server, a router, a network PC, a peer device or other common network node, and typically includes many or all of the elements described above relative to computing device 700. The logical connections depicted in FIG. 7 include a LAN 780 and a WAN 782. The logical connections may be wired, wireless, or any combination thereof.

The WAN 782 can include a number of networks and subnetworks through which data can be routed from the computing device 700 and the remote computer 776, and vice versa. The WAN 782 can include any number of nodes (e.g., DNS servers, routers, etc.) by which messages are directed to the proper destination node.

When used in a LAN networking environment, computing device 700 is connected to the local network 780 through a network interface or adapter 784. When used in a WAN networking environment, computing device 700 typically includes a modem 786 or other means for establishing communications over the wide area network 782, such as the Internet. The modem 786, which may be internal or external, is connected to the bus 736 via a serial port interface 756.

In a networked environment, program modules depicted relative to the computing device 700, or portions thereof, may be stored in the remote memory storage device. It will be appreciated that the network connections shown are exemplary and other means of establishing a communications link between the computers may be used.

The computing device 700 may be implemented as a server computer that is dedicated to server applications or that also runs other applications. Alternatively, the computing device 700 may be embodied in, by way of illustration, a stand-alone personal desktop or laptop computer (PCs), workstation, personal digital assistant (PDA), or electronic appliance, to name only a few.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A method comprising:

retrieving an intermediate node policy having one or more protocol requirements for messages being transmitted to or from the intermediate node, the intermediate node being between a source node and a destination node in a communication path;

forming a first policy-compliant message in accordance with the intermediate node policy, the first policy-compliant message including a request for a destination node policy having one or more protocol requirements for messages being transmitted to or from the destination node;

transmitting the first policy-compliant message to the intermediate node for receipt and validation of the first policy-compliant message by the intermediate node;

receiving the destination node policy;

forming a second policy-compliant message in accordance with both the intermediate node policy and the destination node policy;

transmitting the second policy-compliant message to the destination node;

determining whether the destination node policy specifies an additional intermediate node;

if the destination node policy specifies an additional intermediate node, forming a third policy-compliant message in accordance with the intermediate node policy, the third policy-compliant message including a request for an additional intermediate node policy having one or more protocol requirements for messages being transmitted to or from the additional intermediate node, and if the destination node policy specifies more than one intermediate nodes, the destination node policy also specifies an order of the intermediate nodes in the communication path, the order of intermediate nodes being important for the order of retrieving and applying the policies of the intermediate nodes.

2. The method as recited in claim 1 wherein the forming operation further comprises forming a first policy-compliant message including a source node policy having one or more protocol requirement for messages being transmitted to or from the source node.

3. The method as recited in claim 1 further comprising:

retrieving the destination node policy;

forming a second policy-compliant message, the second policy-compliant message including an underlying message, the second policy-compliant message conforming to the destination node policy;

forming a third policy-compliant message, the third policy-compliant message including the second policy-compliant message, the third policy-compliant message conforming to the intermediate node policy.

4. The method as recited in claim 1 further comprising determining whether the intermediate node policy is compatible with a source node policy having one or more protocol requirement for messages being transmitted to or from the source node.

5. The method as recited in claim 1 further comprising determining whether the intermediate node policy is compatible with a source node policy having one or more protocol requirement for messages being transmitted to or from the source node, wherein the determining operation comprises receiving a notification from a service that the intermediate node policy is compatible with the source node policy.

6. The method as recited in claim 1 wherein the retrieving operation comprises incrementally receiving the intermediate node policy.

7. The method as recited in claim 1 wherein the retrieving operation comprises receiving the intermediate node policy from a node other than the intermediate node.

8. The method as recited in claim 1 wherein the retrieving operation comprises reading the intermediate node policy from a cache memory at the source node.

9. A computer-readable storage medium having a plurality of executable programming instructions stored thereon which, when operated, perform operations comprising:

retrieving a intermediate node policy and a destination node policy, the intermediate node policy having one or more protocol requirements for messages being transmitted to or from an intermediate node and the destination node policy having one or more protocol requirements for messages being transmitted to or from a destination node, the intermediate node being between a source node and the destination node in a communication path;

applying the intermediate node policy and the destination node policy to an underlying message in order of the destination node policy followed by the intermediate node policy;

creating a first policy-compliant message including the underlying message, the first policy-compliant message being created according to the intermediate node policy;

transmitting the first policy-compliant message to the intermediate node for receipt and validation of the first policy-compliant message by the intermediate node;

creating a second policy-compliant message including the first policy-compliant message, the second policy-compliant message being created according to the intermediate node policy and the destination node policy;

transmitting the second policy-compliant message to the destination node;

determining whether the destination node policy specifies an additional intermediate node;

if the destination node policy specifies an additional intermediate node, forming a third policy-compliant message in accordance with the intermediate node policy, the third policy-compliant message including a request for an additional intermediate node policy having one or more protocol requirements for messages being transmitted to or from the additional intermediate node, and if the destination node policy specifies more than one intermediate nodes, the destination node policy also specifies an order of the intermediate nodes in the communication path, the order of intermediate nodes being important for the order of retrieving and applying the policies of the intermediate nodes.

10. The computer-readable storage medium as recited in claim 9 wherein the operation further comprise selecting one of the one or more protocol requirements from the intermediate node policy.

11. The computer-readable storage medium as recited in claim 9 wherein the operation further comprise determining whether the intermediate node policy is compatible with a source node policy havinq one or more protocol requirements for messages being transmitted to or from the source node.

12. The computer-readable storage medium as recited in claim 9 wherein the retrieving operation comprises retrieving one or more of the intermediate node policy and the destination node policy from a node other than the intermediate node, the destination node, and the source node.

13. The computer-readable storage medium as recited in claim 9 wherein the retrieving operation comprises requesting each of the intermediate node policy and the destination node policy in order of the intermediate node followed by the destination node.

14. The computer-readable storage medium as recited in claim 9 wherein the retrieving operation comprises incrementally receiving at least one of the intermediate node policy and the destination node policy.

15. The computer-readable storage medium as recited in claim 9 wherein the retrieving operation comprises reading at least one of the intermediate node policy and the destination node policy from a cache memory at the source node.

16. The computer-readable storage medium as recited in claim 9 wherein the operation further comprise determining whether a message from the intermediate node conforms to a source node policy having one or more protocol requirement for messages being transmitted to or from the source node.

17. A system comprising:

a processor;

a policy retriever configured to be operated by the processor to retrieve an intermediate node policy having one or more protocol requirements for messages being transmitted to or from an intermediate node between a source node and a destination in a communication path;

a message generator configured to be operated by the processor to generate a request message in accordance with the intermediate node policy, the request message including a request for a destination node policy having one or more protocol requirements for messages being transmitted to or from the destination node;

transmitting the request message to the intermediate node for receipt and validation of the request message by the intermediate node;

receiving the destination node policy;

forming a second request message in accordance with both the intermediate node policy and the destination node policy;

transmitting the second request message to the destination node;

determining whether the destination node policy specifies an additional intermediate node;

if the destination node policy specifies an additional intermediate node, forming a third request message in accordance with the intermediate node policy, the third request message including a request for an additional intermediate node policy having one or more protocol requirements for messages being transmitted to or from the additional intermediate node, and if the destination node policy specifies more than one intermediate nodes, the destination node policy also specifies an order of the intermediate nodes in the communication path, the order of intermediate nodes being important for the order of retrieving and applying the policies of the intermediate nodes.

18. The system as recited in claim 17 wherein the policy retriever compares a source node policy having one or more protocol requirement for messages being transmitted to or from the source node to the intermediate node policy to determine whether the source node policy is compatible with the intermediate node policy.

19. The system as recited in claim 18 wherein the policy retriever selects one of the protocol requirements from the intermediate node policy based on the source node policy.

20. The system as recited in claim 18, wherein the message generator further transmits a message to the intermediate node, the message including at least a portion of the source node policy.

21. The system as recited in claim 18, further comprising a policy generator generating the source node policy, wherein generating comprises generating the one or more protocol requirements and at least one relationship operator associated with the or more protocol requirements.

22. The system as recited in claim 21, wherein the policy generator generates a usage attribute related to one of the or more protocol requirements.

23. The system as recited in claim 18 wherein the one or more protocol requirements of the source node policy comprises at least one of:

a security protocol;

a routing parameter;

an encryption algorithm;

an audit trail;

a privacy parameter.

24. The system as recited in claim 18, wherein the source node policy further comprises:

the one or more protocol requirements specifying protocol parameters;

one or more operators related to the one or more protocol requirements, the one or more operators specifying a relationship between the one or more protocol requirements.

25. The system as recited in claim 18, wherein the source node policy further comprises an input policy characterizing input protocol parameters and an output policy characterizing output protocol parameters.

26. A system comprising:

a processor;

a policy retriever means to be operated by the processor for retrieving a plurality of policies, each policy having one or more protocol requirements for messages being transmitted to or from one of a plurality of nodes, the plurality of nodes including at least one intermediate node and a destination node, wherein the retrieving includes requesting each of the intermediate node policy and the destination node policy in order of the intermediate node followed by the destination node;

means to be operated by the processor for applying each of the plurality of policies to a message transmitted to the destination node, such that the message conforms to each of the plurality of policies, wherein the applying includes:

determining whether the intermediate node policy is compatible with a source node policy having one or more protocol requirements for messages being transmitted to or from the source node;

in response to the determining, creating a first policy-compliant message including the underlying message, the first policy-compliant message being created according to the intermediate node policy, transmitting the first policy-compliant message to the intermediate node for receipt and validation of the first policy-compliant message by the intermediate node, and creating a second policy-compliant message including the first policy-compliant message, the second policy-compliant message being created according to the intermediate node policy and the destination node policy;

transmitting the second policy-compliant message to the destination node;

determining whether the destination node policy specifies an additional intermediate node;

if the destination node policy specifies an additional intermediate node, forming a third policy-compliant message in accordance with the intermediate node policy, the third policy-compliant message including a request for an additional intermediate node policy having one or more protocol requirements for messages being transmitted to or from the additional intermediate node, and if the destination node policy specifies more than one intermediate nodes, the destination node policy also specifies an order of the intermediate nodes in the communication path, the order of intermediate nodes being important for the order of retrieving and applying the policies of the intermediate nodes.

27. The system as recited in claim 26 wherein the means for applying comprises a message generator selecting one of the one or more protocol requirements from each of the plurality of policy.

* * * * *

UNITED STATES PATENT AND TRADEMARK OFFICE

CERTIFICATE OF CORRECTION

PATENT NO. : 7,496,649 B2
APPLICATION NO. : 10/783554
DATED : February 24, 2009
INVENTOR(S) : Alfred Lee, IV et al.

It is certified that error appears in the above-identified patent and that said Letters Patent is hereby corrected as shown below:

In column 11, lines 26-30, delete “that a valid policy expression was applied to the message, the operation 400 branches “YES” to a constructing operation 410. The constructing operation 410 constructs a receive channel that implements the selected policy expression.” and insert -- If, on the other hand, the determining operation 406 does determine that a valid policy expression was applied to the message, the operation 400 branches “YES” to a constructing operation 410. The constructing operation 410 constructs a receive channel that implements the selected policy expression. --, as a new paragraph.

In column 19, line 39, in Claim 11, delete “havinq” and insert -- having --, therefor.

Signed and Sealed this
Tenth Day of May, 2011

David J. Kappos
*Director of the United States Patent and Trademark Office*